United States Patent
Arimitsu et al.

(10) Patent No.: US 6,774,591 B2
(45) Date of Patent: Aug. 10, 2004

(54) MOTOR/GENERATOR

(75) Inventors: Minoru Arimitsu, Yokosuka (JP); Shouichi Maeda, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 51 days.

(21) Appl. No.: 10/227,443

(22) Filed: Aug. 26, 2002

(65) Prior Publication Data

US 2003/0062784 A1 Apr. 3, 2003

(30) Foreign Application Priority Data

Aug. 30, 2001 (JP) ........................................ 2001-260646

(51) Int. Cl.[7] .............................. H02P 5/26; H02P 5/34; H02P 9/14; H02K 47/20; H02K 16/02
(52) U.S. Cl. ....................... 318/154; 318/151; 318/730; 318/801; 322/16; 322/62; 322/88; 310/113; 310/114
(58) Field of Search ................................. 318/148, 151, 318/154, 730, 801, 806, 811, 139, 432–434; 322/14–16, 62, 88; 310/112–114, 144–146, 266

(56) References Cited

U.S. PATENT DOCUMENTS

| | | | | |
|---|---|---|---|---|
| 6,049,152 A | * | 4/2000 | Nakano | 310/114 |
| 6,201,331 B1 | * | 3/2001 | Nakano | 310/114 |
| 6,211,597 B1 | * | 4/2001 | Nakano | 310/266 |
| 6,291,963 B2 | * | 9/2001 | Nakano | 318/801 |
| 6,335,606 B1 | * | 1/2002 | Minagawa et al. | 318/801 |
| 6,429,562 B2 | | 8/2002 | Nakano et al. | |
| 6,448,725 B1 | | 9/2002 | Cho et al. | |
| 6,472,788 B1 | * | 10/2002 | Nakano | 310/114 |
| 6,472,845 B2 | * | 10/2002 | Minagawa et al. | 318/801 |
| 6,646,394 B2 | * | 11/2003 | MInagawa et al. | 318/151 |
| 2003/0011255 A1 | * | 1/2003 | Arimitsu et al. | 310/68 R |

FOREIGN PATENT DOCUMENTS

| | | |
|---|---|---|
| DE | 100 54 594 A1 | 8/2001 |
| EP | 0 945 963 A2 | 9/1999 |
| EP | 1 107 434 A2 | 6/2001 |
| JP | 11-275826 | 10/1999 |
| JP | 11356015 A * 12/1999 | .......... H02K/16/02 |
| JP | 2001258218 A * 9/2001 | .......... H02K/16/02 |

\* cited by examiner

*Primary Examiner*—Shih-Yung Hsieh
*Assistant Examiner*—Edgardo San Martin
(74) *Attorney, Agent, or Firm*—Foley & Lardner LLP

(57) ABSTRACT

A motor/generator comprises a stator (2) having plural coils (C1–C14), and plural rotors (3, 4) disposed coaxially with the above-mentioned stator and driven by a compound current. The phase difference between the currents (70, 71) driving the rotors (3, 4) is arranged to be other than 180 degrees. Thereby, the utilization factor of the voltage of the direct current power supply (10) is improved.

5 Claims, 9 Drawing Sheets

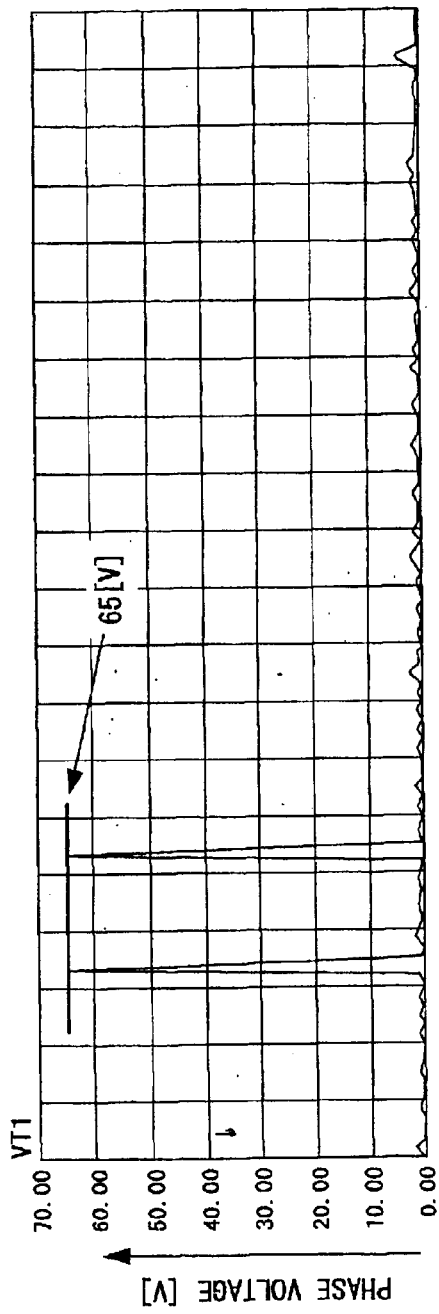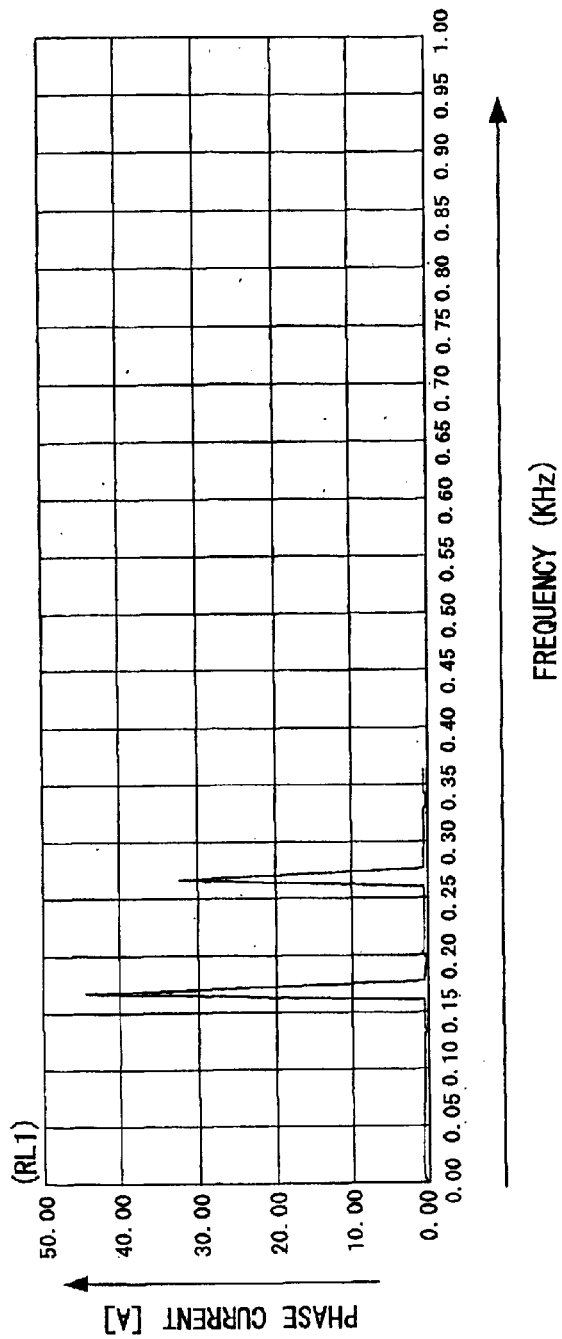
FIG. 7A
FIG. 7B

MOTOR/GENERATOR

FIELD OF THE INVENTION

This invention relates to a motor/generator provided with two or more rotors driven by a compound current.

BACKGROUND OF THE INVENTION

JP1999-275826A published by the Japanese Patent Office in 1999 discloses a motor/generator driven by a compound current. This motor/generator provides a cylindrical inner rotor and a hollow outer rotor disposed coaxially with a hollow cylindrical stator, there being a predetermined gap between the inside and outside of the stator.

SUMMARY OF THE INVENTION

However, in this conventional motor/generator, even if linear voltage control is performed by an inverter, the maximum phase voltage of each phase can only be half of the alternating current voltage supplied from the inverter, and the utilization factor of the voltage is low. Moreover, as the phase voltage cannot be increased even if the current utility factor is improved by using a compound current, the required apparent power becomes small.

If the alternating current voltage is increased by using a chopper, the alternating current voltage is high and the loss of the inverter increases. Furthermore, the number of power devices forming the inverter increased, the number of electronic parts, such as drivers, increased as a result, and this leads to restriction of layout flexibility and increased cost.

It is therefore an object of this invention to provide a motor/generator which solves the above-mentioned problem. The details as well as other features and advantages of this invention are set forth in the remainder of the specification and are shown in the accompanying drawings.

To achieve the above objects, this invention provides a motor/generator comprising a stator in which plural coils are disposed, rotors that are coaxially arranged with the stator and rotate by magnetic force generated by the coils, a device that generates a compound current from a direct current base on a command voltage to supply to the coils, and a controller functioning to calculate a neutral point potential and calculate the command voltage with reference to the neutral point potential.

BRIEF DESCRIPTION OF THE DRAWINGS

FIGS. 7A–7B are spectrum drawings of the phase voltage generated by the inverter of this invention.

DESCRIPTION OF THE PREFERRED EMBODIMENTS

Figure 1:
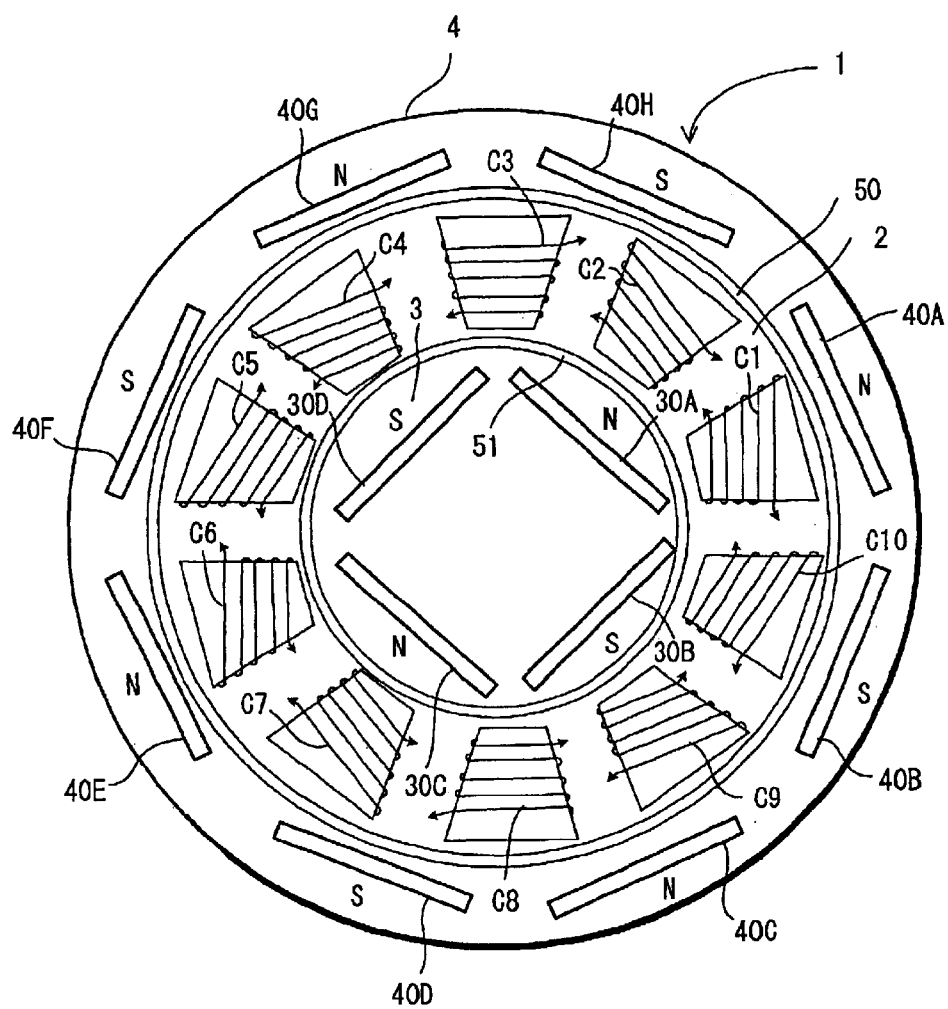
FIG. 1 is a schematic diagram of a motor/generator according to this invention.

Referring to FIG. 1, the motor/generator 1 according to this invention is provided with a cylindrical stator 2 comprising coils C1–C10, an outer rotor 4 coaxial with the stator 2 and situated outside the stator 2, and an inner rotor 3 coaxial with the stator 2 and situated inside the stator.

The stator 2 and outer rotor 4, and the stator 2 and inner rotor 3, are respectively separated by a gap 50 and a gap 51.

Five sets of coils C1–C10 are disposed in the stator 2. Each set of coils is composed of two coils and is arranged to be symmetric each other about the rotation axis of the stator 2.

The current input side is connected to these symmetrical coils C1–C10 so that the same current flows through all of them.

Specifically, the connection is such that the same current flows through coils C1 and C6, C2 and C7, C3 and C8, C4 and C9, C5 and C10.

By passing an alternating current through the coils C1–C10, a magnetic field which rotates the inner rotor 3 and the outer rotor 4 is generated.

The inner rotor 3 is provided with a predetermined number of pairs of permanent magnets 30A–30D. Each pair is composed of two permanent magnets each having the N pole or the S pole. The number of these pairs is hereafter referred to as 'number of pole pairs'.

The number of pole pairs of the permanent magnet 30 with which the inner rotor 3 is provided is represented by the following equation.

$$\text{Number of pole pairs} = (\text{number of coils of stator})/(\text{phase of drive current}) \quad (1)$$

According to this embodiment, as the stator 2 is provided with ten coils, the number of sets of the permanent magnets 30 with which the inner rotor 3 is provided is 10/5=2.

These permanent magnets 30A–30D are arranged at intervals of 90 degrees symmetrically about the axis of rotation of the inner rotor 3, and such that the N-poles and S-poles are alternating.

The outer rotor 4 also comprises permanent magnets 40 with twice the number of pole pairs of the permanent magnets 30 with which the inner rotor 3 is provided. Each pole pair comprises a N-pole permanent magnet 40 and a S-pole permanent magnet. According to this embodiment, as the inner rotor 3 is provided with a permanent magnet having two pole pairs, the number of pole pairs of the permanent magnets 40 with which the outer rotor 4 is provided is 2×2=4.

As in the case of the inner rotor 3, these permanent magnets 40 are arranged at intervals of 45 degrees symmetrically on both sides of the axis of rotation of the outer rotor 3, and with alternating N and S poles.

Figure 2:
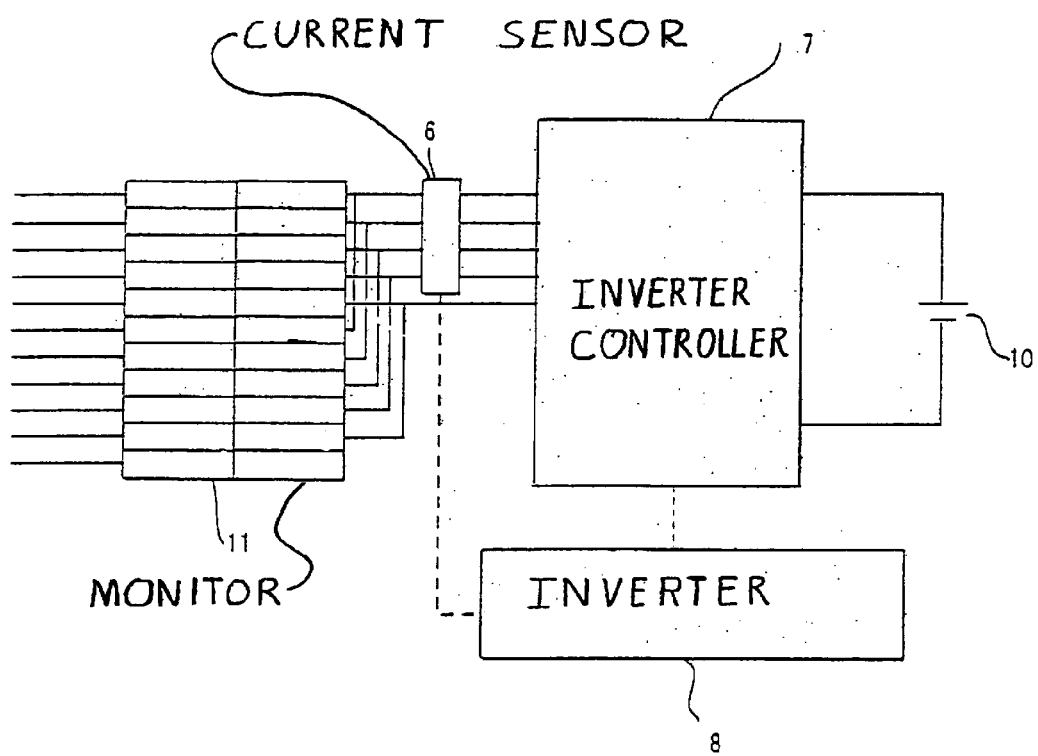
FIG. 2 is a schematic block diagram of the motor/generator of this invention.

Next, referring to FIG. 2, the motor/generator 1 is further provided with a 5-phase inverter 8 which generates an alternating current supplied to the stator 2, an inverter controller 7 which controls a 5-phase inverter 8, a direct current power supply 10 which supplies direct current to the 5-phase inverter 8, and a current sensor 6 which detects the output current of the 5-phase inverter 8.

The inverter controller 7 calculates the drive current comprising a sinusoidal wave required to drive the inner rotor 3 and the outer rotor 4. The inverter controller 7 calculates a command voltage for generating a compound current which combines these two currents, and transmits the command voltage to the 5-phase inverter 8. This compound current comprises a current component which drives the inner rotor 3, and a current component which drives the outer rotor 4. The calculation of the command voltage will be described in detail later.

The 5-phase inverter 8 generates the same wave-like alternating current as the command voltage from the direct current supplied from the direct current power supply 10 based on the command voltage, and supplies it to the coils C1–C10 via a terminal 11. These alternating currents generate magnetism in the coils C1–C10 which drives the inner rotor 3 and the outer rotor 4. The compound current, after flowing in the coils C1–C10, flows to a neutral point connection.

The current sensor 6 monitors the output voltage from the 5-phase inverter 8, and feeds it back to the inverter controller 7.

According to this invention, regarding the compound current obtained by combining the drive current of the inner rotor 3 and the drive current of the outer rotor 4, the current which drives one of the inner rotor 3 and outer rotor 4, has a phase difference other than 180 degrees relative to the other current. Specifically, one of the drive currents is not advanced or delayed by 180 degrees relative to the other drive current.

For example, a 4-phase alternating current having a phase which is a multiple of 90 degrees and a 6-phase alternating current having a phase which is a multiple of 60 degrees, are alternating currents having a mutual phase difference of 180 degrees. On the other hand, as will be described later, compound currents comprising a 5-phase alternating current and a 7-phase alternating current do not have a phase difference of 180 degrees, therefore the principle of this invention can be applied.

Although a 1.5-phase alternating current, for example, also does not have a phase difference of 180 degrees, the motor/generator 1 cannot be started with a phase of 2 or less, so the alternating current of the compound current is given a phase of 2 or more.

Here, let the number of phase of the drive current comprising the compound current be N. If the number of pole pairs of the inner rotor 3 driven by a N-phase alternating current satisfying the condition of not having the phase difference of 180 degrees, is given an arbitrary natural number M, the number of coils P of the stator 2 is expressed by the following equation.

$$P = N \times M \quad (2)$$

Moreover, the number of pole pairs L of the outer rotor 4 is given by the following equation, as mentioned above.

$$L = M \times 2 \quad (3)$$

Therefore, the phase number of the alternating current which drives the outer rotor 4 is N/2.

As an example, if N=5, the drive current of the inner rotor 3 will be 5-phase, and the drive current of the outer rotor 4 will be 2.5-phase. The phase at the instant when the voltage of each drive current is a peak, is a number given by the following table (4).

| Phase Sequence | 5-phase current | 2.5-phase current |
|---|---|---|
| 1 | 0 | 0 |
| 2 | −72 | −144 |
| 3 | −144 | −228 |
| 4 | −216 | −72 |
| 5 | −228 | −216 |

The unit of phase in the table is electrical degrees.

As shown in the table above, when N=5, the phase difference of the two drive currents does not become 180 degrees.

When driving the inner rotor 3 by the 5-phase alternating current and driving the outer rotor 4 by the 2.5-phase alternating current, the inverter controller 7 calculates a target voltage of each phase using the following equation (5).

$$V1 = Vi \times \sin(\theta i - 0 \ deg + \alpha) + Vo \times \sin(\theta o - 0 \ deg + \beta)$$

$$V2 = Vi \times \sin(\theta i - 72 \ deg + \alpha) + Vo \times \sin(\theta o - 144 \ deg + \beta)$$

$$V3 = Vi \times \sin(\theta i - 144 \ deg + \alpha) + Vo \times \sin(\theta o - 288 \ deg + \beta)$$

$$V4 = Vi \times \sin(\theta i - 216 \ deg + \alpha) + Vo \times \sin(\theta o - 72 \ deg + \beta)$$

$$V5 = Vi \times \sin(\theta i - 288 \ deg + \alpha) + Vo \times \sin(\theta o - 216 \ deg + \beta)$$

where, V1–V5=target voltage of the compound current for each phase
$\theta i$=phase angle
$\alpha$=initial phase angle of inner rotor drive current
$\beta$=initial phase angle of outer rotor drive current The left-hand term on the right-hand side of the above-mentioned equation shows the command voltage of the inner rotor 3, and the right-hand term shows the target voltage of the outer rotor 4.

Figure 3:
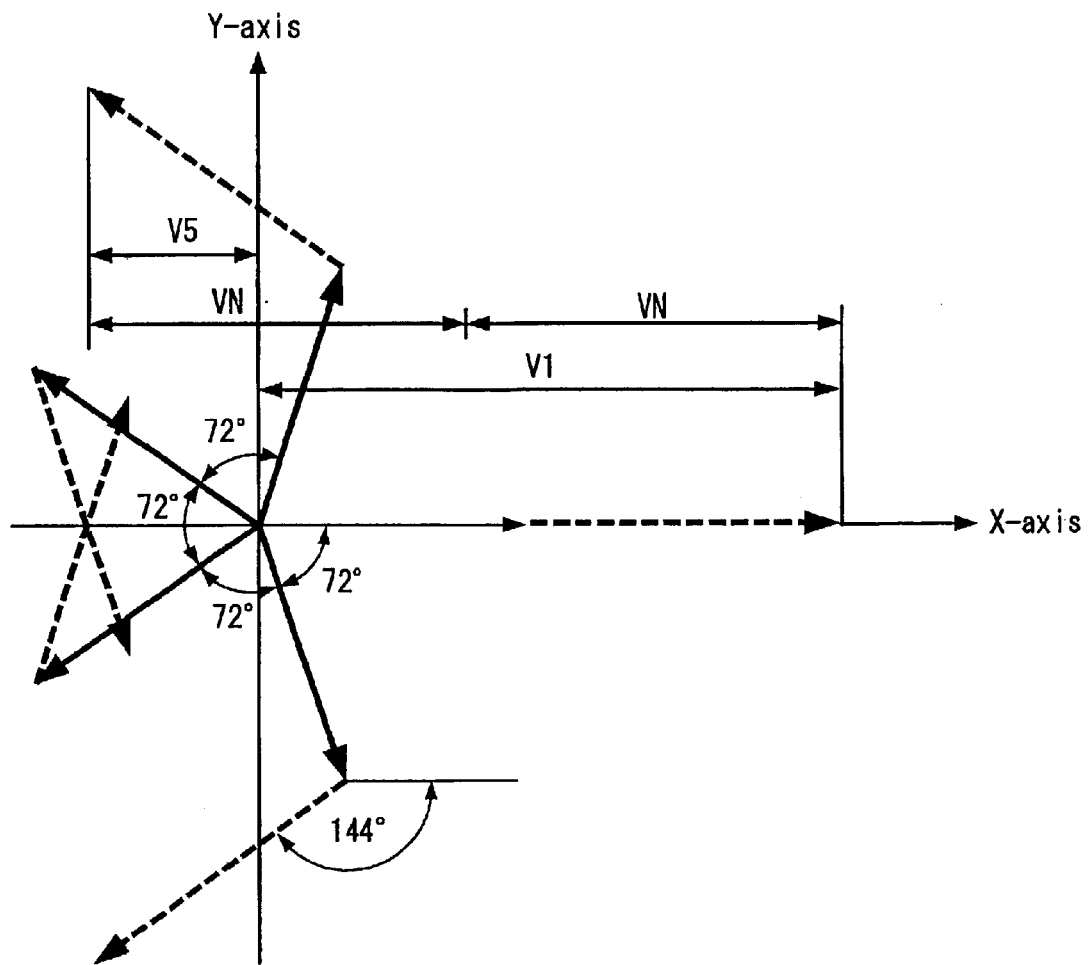
FIG. 3 is a phaser diagram describing a compound current.

FIG. 3 is a phaser diagram for calculating the neutral point potential VN of the 5-phase alternating current and the 2.5-phase alternating current. The phaser shown by the solid line shows the voltage of the 5-phase alternating current which drives the inner rotor 3 for each phase, and the phaser shown by a dashed line shows the voltage of the 2.5-phase alternating current which drives the outer rotor 4 for each phase. The sum of the phasers of the 5-phase alternating current and the 2.5-phase alternating current is shown by the end of the phaser shown by a dashed line.

Here, the maximum size of the X-axis component mapped by the X-axis of the voltage phaser at each phase, is calculated. As shown in FIG. 3, as the maximum voltage is V1 and the minimum voltage is V5, the total length of the voltage phaser of each phase of the X-axis component is V1+V5.

In this case, the neutral point potential VN of the compound current is given by the following equation using the target voltage calculated by the formula (5) above.

$$VN = (\max(V1 \sim V5) - \min(V1 \sim V5))/2 \quad (6)$$

where, max(V1~V5)=maximum phaser in the phaser at each phase
min(V1~V5)=minimum phaser in the phaser at each phase According to the phaser drawing showing in FIG. 3, the maximum voltage is V1 and the minimum voltage is V5, so the neutral point potential is VN=(V1−V5)/2.

As compound current is generated from the direct current supplied by the direct current power supply 10, the greatest length of this phaser cannot exceed the voltage of the direct current power supply 10. This relation is expressed by the following equations.

$$|Vk - Vm| \leq V_{DC} \quad (7)$$

where, $V_{DC}$=direct current voltage
Vk=maximum voltage
Vm=minimum voltage

However, based on the X-axis or the Y-axis, the command voltage can be set only in a range of a magnitude equal to the positive direction and the negative direction relative to the X-axis. For example, when the voltage of the direct current power supply 10 is 100 volts, the command voltage cannot exceed 50 volts in the positive direction, and cannot exceed 50 volts in the negative direction.

When based on the neutral point potential VN, a command voltage exceeding 50 volts can be set in the positive direction and a command voltage exceeding 50 volts can be set in the negative direction relative to the neutral point potential VN.

As an example, a compound current is assumed for which the voltage of the direct current power supply 10 is 100 volts, V1=70 volts and V5=−30 volts. At this time, the neutral point potential VN is 20 volts from the equation (6). If the command voltage is calculated on the basis of the intersection of the X-axis and the Y-axis, as V1 will exceed the range of 50 volts, the compound current cannot be generated. However, if the command voltage is calculated on the basis of the neutral point potential, as V1 and V5 will be within the range of 20 to 50 volts of the neutral point potential VN, the compound current can be generated.

In order to perform the above-mentioned operation, according to this invention, the inverter controller 7 performs a calculation expressed by the following equation (8).

$$V'1 = V1 - VN$$
$$V'2 = V2 - VN$$
$$V'3 = V3 - VN$$
$$V'4 = V4 - VN$$
$$V'5 = V5 - VN$$

Where, V'1–V'5=command voltage based on the neutral point potential

The inverter controller 7 transmits the calculated command voltage V'1–V'5 to the 5-phase inverter 8, and the 5-phase inverter 8 generates a compound current based on this command voltage V'1–V'5.

Next, the concept of this invention will be described referring to FIG. 4 and FIG. 5. The peak voltage and frequency of a drive voltage 70 of the inner rotor 3 and a drive voltage 71 of the outer rotor 4 are assumed to be the same to facilitate understanding. Moreover, the specification in this description does not necessarily coincide with the specification of this embodiment.

Figure 4:
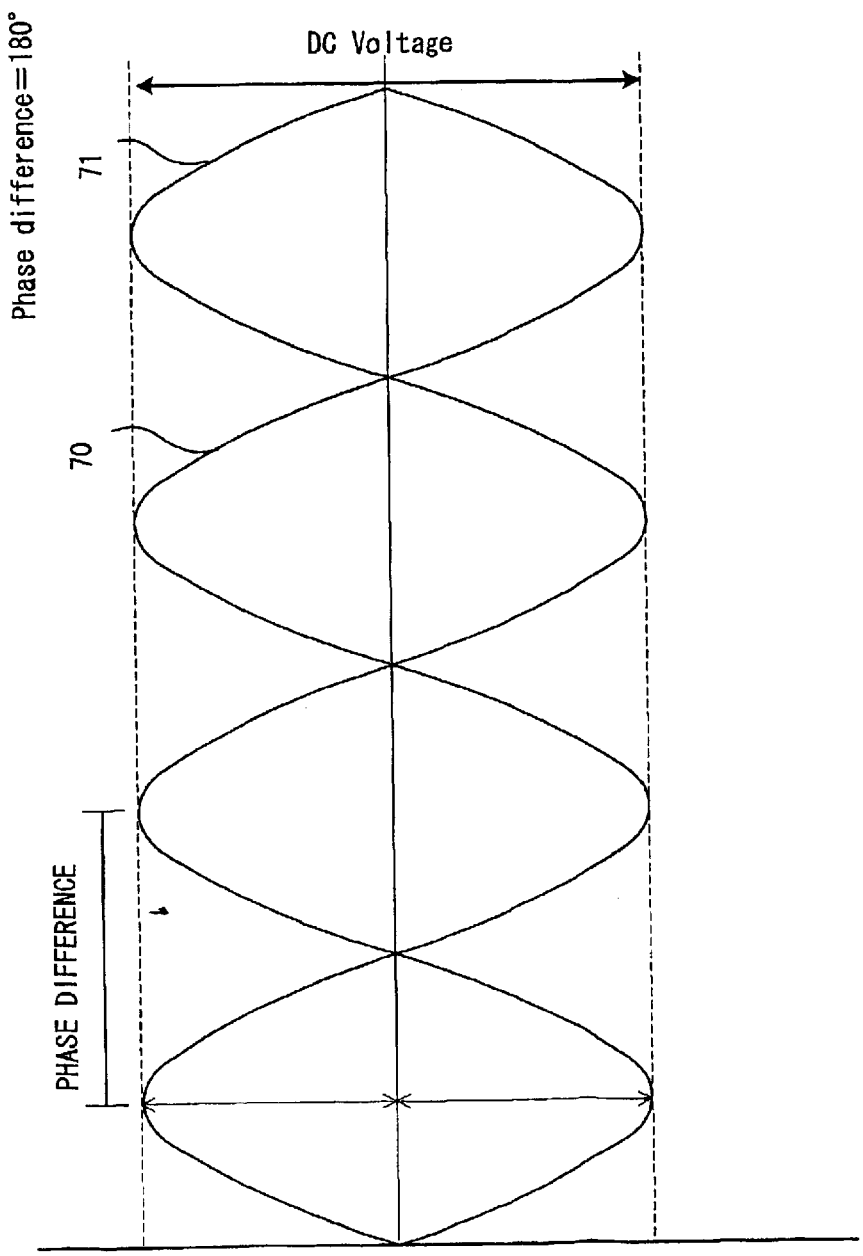
FIG. 4 is a diagram showing a compound current having a drive current with a phase difference of 180 degrees.

FIG. 4 shows a voltage waveform when the drive voltage 70 of the inner rotor 3 and the drive voltage 71 of the outer rotor 4 have a mutual phase difference of 180 degrees. In this case, as the drive voltage 70 of the inner rotor 3 and the drive voltage 71 of the outer rotor 4 reach a peak at the same time, the voltage difference between the peak to peak of the drive voltages 70, 71 is the voltage of the direct current power supply 10.

Figure 5:
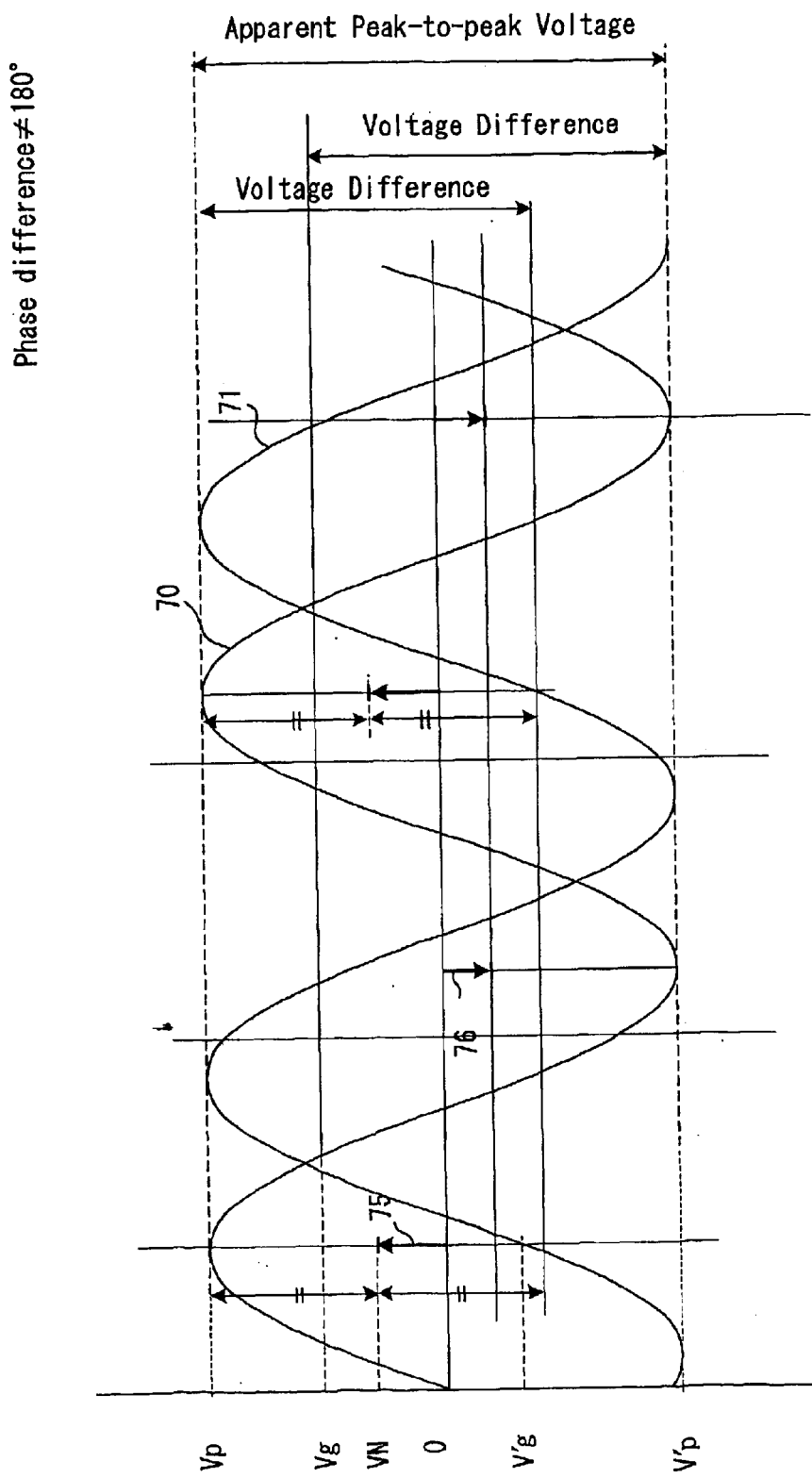
FIG. 5 is a diagram showing a compound current having a drive current with a phase difference other than 180 degrees.

On the other hand, as shown in FIG. 5, when the drive voltage 70 of the inner rotor 3 and drive voltage 71 of the outer rotor 4 do not have a phase difference of 180 degrees, the peak of the drive voltage 70 of the inner rotor 3 and the drive voltage 71 of the outer rotor 4 cannot occur at the same phase. That is, when the drive voltage 70 of the inner rotor 3 reaches a peak, as the drive current 71 of the outer rotor 4 is offset from the peak, the voltage difference between the drive voltage 70 and the drive voltage 71 is smaller as compared with the case where the phase difference is 180 degrees.

As stated previously, the inverter controller 7 calculates the neutral point voltage VN by dividing the difference between the peak voltage Vp of the drive voltage 70 of the inner rotor 3 and the voltage V'g of the drive voltage 71 of the outer rotor 4, by 2. The drive voltages 70, 71 are recalculated on the basis of the neutral point voltage VN, and the command voltage V' is set. At this time, the voltage difference between the drive voltages 70, 71 based on the neutral point potential VN is less than the direct current voltage supplied by the direct current power supply 10 to the inverter 8.

On the other hand, when the drive voltage 71 of the outer rotor 4 reaches the peak voltage V'p, the voltage difference between the peak voltage V'p of the drive voltage 71 for the outer rotor 4 and the drive voltage V'g for the inner rotor 3 is divided by 2. From this, the neutral point voltage VN is calculated. The drive voltages 70, 71 are recalculated on the basis of this neutral point voltage VN, and the command voltage V' is set. At this time also, the voltage difference between the drive voltages 70, 71 based on the neutral point voltage VN is less than the voltage of the direct current voltage supply 10.

The inverter controller 7 performs the above computation continuously so as to follow the neutral point voltage VN as the phase varies. Therefore, the inverter controller 7 can be set so that the peak to peak voltage of the drive voltage 70 of the inner rotor 3 and the drive voltage 71 of the outer rotor 4 are larger than the direct current voltage of the direct current power supply 10. Thereby, a larger drive voltage than the voltage actually supplied by the direct current power supply 10 can be obtained, and the utilization factor of the direct current voltage is improved.

Here, the improved direct current voltage utilization factor will be described. In FIG. 3, the angle of 2.5-phase at which the distance at the tip of the phaser in the X-axis or the Y-axis is a maximum relative to 5-phase, is determined. This angle is given by the following equation.

$$2V \sin 72 + V \sin(36+\theta) + V \sin(36-\theta) = 2V\{\sin 72 + \sin 36 \cos \theta\} \quad (9)$$

According to this equation, when θ=0, the voltage V is a maximum, and the maximum voltage is given by the following equation.

$$2V = \frac{V_{DC}}{1.5388} \quad (10)$$

Here, the reason for assigning 2V is that voltages are supplied to the inner rotor 3 and the outer rotor 4, respectively.

On the other hand, in the usual symmetrical 4-phase alternating current which does not use a compound current which has a 180 degree phase shift, the voltage of each phase is given by the following equation.

$$|V1| = |V2| = |V3| = |V4| = V \quad (11)$$

Here, V satisfies the following condition.
$2V = V_{DC}$

Here, the voltage utilization factor of the 4-phase alternating current and the 5-phase alternating current is compared with the case when the direct current voltage of the inverter $V_{DC}$ is 100 volts. For the 4-phase alternating current, the phase voltage can be set to 50 volts at the maximum, and for 5-phase alternating current, it is set to approximately the calculated 65 volts. This gives about 30% improvement in efficiency compared to the 4-phase alternating current. At this time, the inner rotor 3 and the outer rotor 4 can share 32.5V, respectively.

As there is no phase shift of 180 degrees phase for the command voltages from the controller 7 to the inner rotor 3 and the outer rotor 4, the neutral point potential will vary sharply.

Figure 6A:
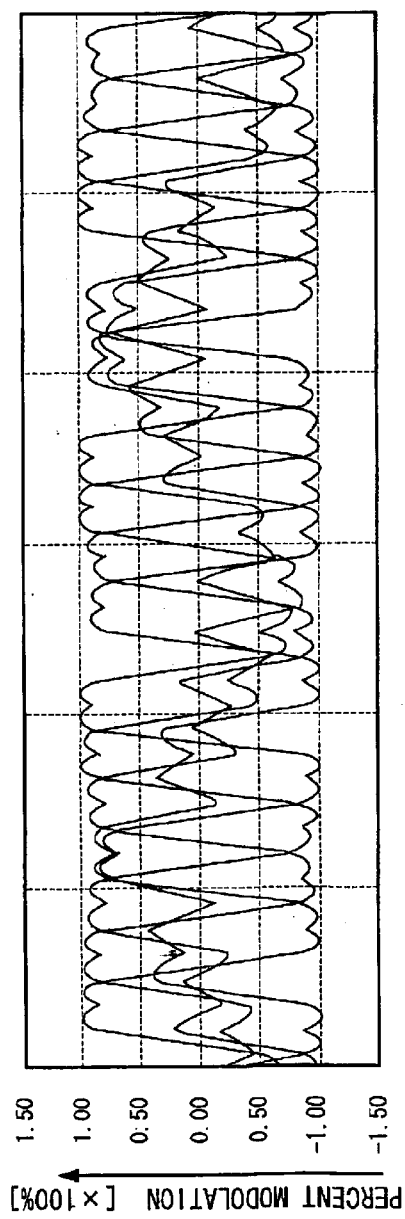
FIGS. 6A–6B are diagrams showing the characteristics of the compound current generated by the inverter of this invention.
Figure 6B:
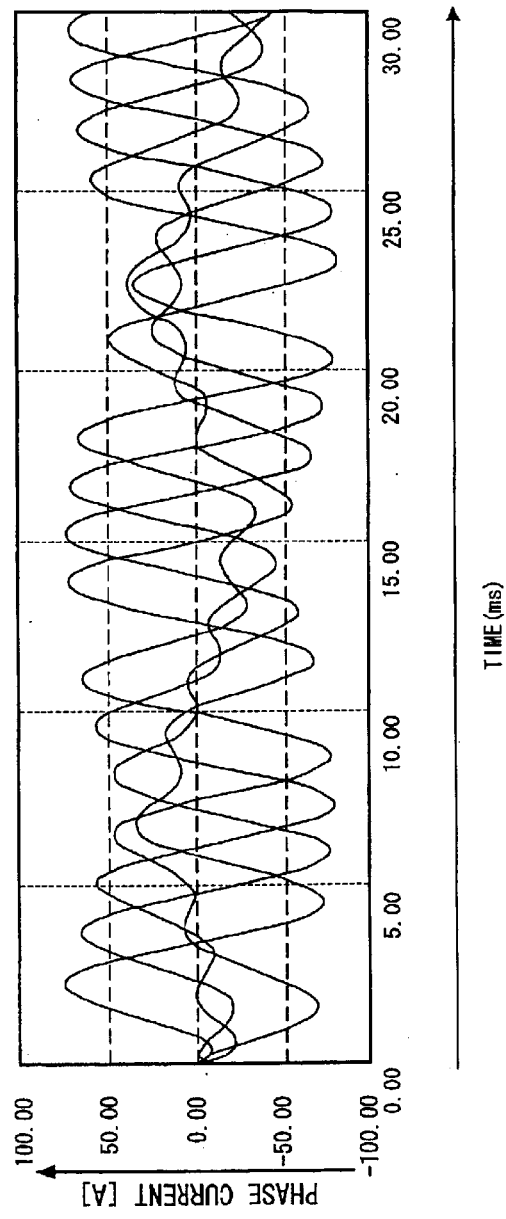
Figure 8:
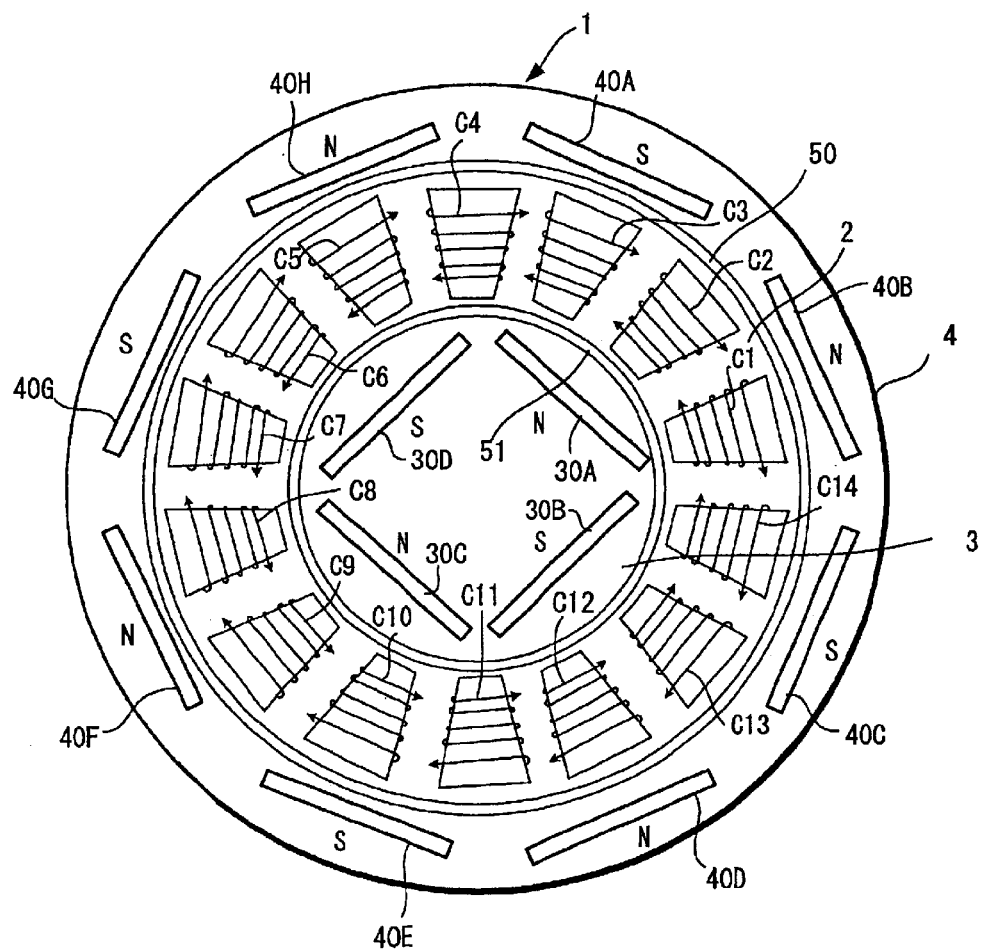
FIG. 8 is a diagram showing the motor/generator according to a second embodiment of this invention.
Figure 9:
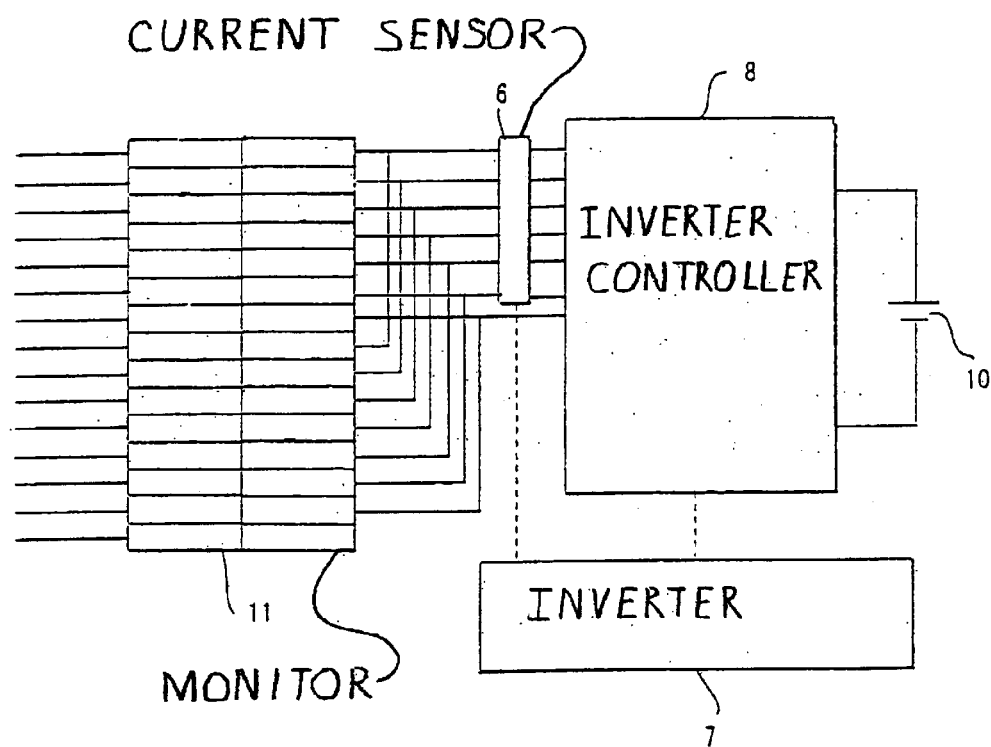
FIG. 9 is a schematic block diagram describing the second embodiment of this invention.

Next, referring to FIGS. 6 and 7, the gate driving signal which the 5-phase inverter 8 generates will be described. FIG. 6A shows the modulation rate computed by the inverter controller 7, and FIG. 6B shows the phase current corresponding to this modulation rate.

Although not shown, in the usual symmetrical 4-phase alternating current, when the direct current voltage is 200 volts, when the inverter controller 7 commands a voltage of 65 volts to the inner rotor 3 and the outer rotor 4, the maximum voltage of the compound current is 65 volts×2= 130 volts. As this is 30% of over voltage, it cannot drive the motor/generator 1.

However, according to this embodiment, the modulation rate can be suppressed to below 100% by line voltage control, as there is no phase for which there is a mutual phase difference of 180 degrees. At this time, as shown in FIG. 5, the spectra of the phase voltages both show 65 volts.

Therefore, by not shifting the 180 degree phase, i.e., by not advancing or retarding the 180 degree phase, the utilization factor of the direct current voltage can be improved.

Moreover, the phase voltage of the motor/generator 1 driven by the compound current can be improved, and the required inverter apparent power can be increased.

Further, when a chopper which increases the phase voltage is used, the loss of the inverter due to the increased direct current voltage can be prevented.

The number of the power devices forming the inverter is reduced, therefore the number of electronic parts such as drivers can also be reduced, and it is possible to improve layout flexibility and reduce costs.

As shown in equation (1), the basic sinusoidal wave patterns for the inner rotor 3 and the outer rotor 4 are similar. Therefore, it is unnecessary to generate a sinusoidal wave pattern for each of the inner rotor 3 and the outer rotor 4, and the memory capacity of the inverter controller 7 can be reduced.

A second embodiment of this invention will now be described referring to FIG. 5.

According to this embodiment, the stator 2 is provided with 14 coils C1–C14. As the current supplied to the coils C1–C14 is 7-phase alternating current, the motor/generator 1 is provided with a 7-phase inverter 8.

Further, the 14 terminals are provided in the inverter terminal 11. The other components are identical to the components of the first embodiment. The same reference numbers are given to the same components as those of the first embodiment.

According to this embodiment, the target voltage which the inverter controller 7 calculates is given by the following equations (12).

$V1 = Vi \times \sin(\theta i - 0 \ deg + \alpha) + Vo \times \sin(\theta o - 0 \ deg + \beta)$ $V2 = Vi33 \sin(\theta i - 51.4 \ deg + \alpha) + Vo \times \sin(\theta o - 102.9 \ deg + \beta)$ $V3 = Vi \times \sin(\theta i - 102.9 \ deg + \alpha) + Vo \times \sin(\theta o - 205.7 \ deg + \beta)$ $V4 = Vi \times \sin(\theta i - 154.3 \ deg + \alpha) + Vo \times \sin(\theta o - 308.6 \ deg + \beta)$ $V5 = Vi \times \sin(\theta i - 205.7 \ deg + \alpha) + Vo \times \sin(\theta o - 51.4 \ deg + \beta)$ $V6 = Vi \times \sin(\theta i - 257.1 \ deg + \alpha) + Vo \times \sin(\theta o - 154.3 \ deg + \beta)$ $V7 = Vi \times \sin(\theta i - 308.6 \ deg + \alpha) + Vo \times \sin(\theta o - 257.1 \ deg + \beta)$ In the above equations, as in the equation (1) shown in the first embodiment, since the phase difference between the command voltage to the inner rotor 3 and the outer rotor 4 is other than 180 degrees, the neutral point potential fluctuates.

The inverter controller 7 calculates the neutral point potential using the following equation.

$$VN = (\max(V1 \sim V7) - \min(V1 \sim V7))/2 \qquad (13)$$

where, max $(V1-V7)$ = the maximum voltage in each phase
min $(V1-V7)$ = the minimum voltage in each phase As there is no effect on the phase potential attained even if the neutral point potential VN is deducted from the target voltage of each phase, the value obtained by deducting the neutral point potential from the target voltage using the following equations (14) is newly set as the target voltage.

$V'1 = V1 - VN$ $V'2 = V2 - VN$ $V'3 = V3 - VN$ $V'4 = V4 - VN$ $V'5 = V5 - VN$ $V'6 = V6 - VN$ $V'7 = V7 - VN$

The command voltage V'1–V'2 calculated by the above equations drives the gates of the 7-phase inverter 8.

In this way, the utilization factor of the direct current voltage can be improved as in the first embodiment, and the number of power devices which form the inverter can be reduced.

This invention can also be incorporated in a motor/ generator which has a N-connection which distributes current to each coil, which was disclosed by U.S. application Ser. No. 09/731,862 submitted by the Applicant.

Thereby, the reactive current is reduced, and copper loss and generation of heat are prevented.

This invention was described for a N-phase alternating current which drives the inner rotors 3 and the outer rotor 4 using 2.5-phase alternating current and 5-phase alternating current which do not have a phase difference of 180 degrees. However, this invention is not limited to a combination of 2.5-phase alternating current and 5-phase alternating current, and provided that it is an alternating current which has a phase difference other than 180 degrees, there is no limitation on the phase of the alternating current.

Moreover, the number of pole pairs of the inner rotor 3 and the outer rotor 4 may be reversed.

The entire contents of Japanese Patent Application P2001-260646 (filed on Aug. 30, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A motor/generator comprising:

a stator in which a plural coils are disposed;

two rotors which have different numbers of pole pairs and are coaxially arranged with the stator and rotate by magnetic force generated by the coils;

a device that generates a compound current from a direct current based on a command voltage to supply to the coils, the compound current being compounded with two currents, each of the currents driving each of the rotors; and a controller functioning to:

calculate a neutral point potential of the compound current; and calculate the command voltage with reference to the neutral point potential, wherein the compound current comprises currents, for driving the rotors, having a phase difference other than 180 degrees.

2. The motor/generator as defined in claim 1, wherein each of the driving currents has phases of a real number of two or more.

3. The motor/generator as defined in claim 1, wherein the rotors comprise a inner rotor that is arranged inside the stator and an outer rotor that is arranged outside the stator, one of the rotors comprises pole pairs of permanent magnets of a predetermined natural number M and is driven by an alternating current having phases of number N, the other rotor has the pole pairs of permanent magnet twice as many as M and is driven by a alternating current having phases of N/2, and the stator comprises the coils of the number P defined by the following equation:

$$P = N \times M.$$

4. A motor/generator comprising:

a stator in which a plural coils are disposed;

two rotors which have different numbers of pole pairs and are coaxially arranged with the stator and rotate by magnetic force generated by the coils;

a device that generates a compound current from a direct current based on a command voltage to supply to the coils, the compound current being compounded with two currents, each of the currents driving each of the rotors; and a controller functioning to:

calculate a neutral point potential of the compound current; and calculate the command voltage with reference to the neutral point potential, wherein the rotors comprise an inner rotor that is arranged inside the stator and an outer rotor that is arranged outside the stator, wherein one of the rotors comprises pole pairs of permanent magnets of a predetermined natural number M and is driven by an alternating current having phases of 5, and wherein the other rotor has the pole pairs of permanent magnet twice as many as M and is driven by a alternating current having phases of 2.5, and the stator comprises the coils of M×5.

5. The motor/generator as defined in claim 4, wherein the motor/generator comprises a N-connection that distributes the compound current to the coils.

* * * * *